Oct. 15, 1968 L. E. SOMERS 3,406,405

THERMAL MODULATION THERMOPLASTIC RECORDING

Filed July 6, 1961 2 Sheets-Sheet 1

INVENTOR:
LEWIS E. SOMERS,
BY Marvin A. Goldenberg
HIS ATTORNEY.

Oct. 15, 1968 L. E. SOMERS 3,406,405

THERMAL MODULATION THERMOPLASTIC RECORDING

Filed July 6, 1961 2 Sheets-Sheet 2

INVENTOR:
LEWIS E. SOMERS,

BY Marvin A. Goldenberg
HIS ATTORNEY.

United States Patent Office 3,406,405

Patented Oct. 15, 1968

3,406,405

THERMAL MODULATION THERMOPLASTIC RECORDING

Lewis E. Somers, Baldwinsville, N.Y., assignor to General Electric Company, a corporation of New York Filed July 6, 1961, Ser. No. 122,223

17 Claims. (Cl. 346—1)

The present invention relates to thermal modulation thermoplastic recording providing novel methods and means for impressing information on a thermoplastic recording member.

Known thermoplastic recording systems, in general, permit information in electrical or optical form to be stored on a thermoplastic recording member, normally a tape comprising a plastic base layer, an intermediate conducting layer and a layer of thermoplastic material. Storage is accomplished by first applying to the surface of the thermoplastic material a differential electrostatic charge modulated in accordance with the input information, uniformly heating the thermoplastic material to deform the surface thereof in accordance with the forces exerted by the electrostatic surface charge, and subsequently cooling the thermoplastic so as to set the deformations. The stored information may be retrieved by conventional optical phase demodulation systems which respond to the diffraction effects of projected light.

In one prior embodiment the differential electrostatic charge is applied to the thermoplastic surface in the presence of a vacuum by an electron beam, such as disclosed in a copending application for U.S. Letters Patent, Ser. No. 8,842, now Patent No. 3,113,179, entitled, "Method, Apparatus and Medium for Recording," filed Feb. 15, 1960, by William E. Glenn and assigned to the assignee of the present invention.

In another known technique, the differential electrostatic surface charge is applied in an air atmosphere by employing a photoconductor, the resistance characteristics of which is modulated in accordance with an optical input. One such system is described in a copending application for U.S. Letters Patent, Ser. No. 862,249, entitled, "Direct Image Transfer to Thermoplastic Tape," filed Dec. 28, 1959, by Sterling P. Newberry and assigned to the assignee of the present invention.

The present invention relates to still another technique for impressing information on a thermoplastic recording medium in which information is recorded in a manner different from what has been done previously. The invention does not require application of an information modulated electrostatic charge, nor operation in an evacuated chamber. As a result, a number of advantages of simplicity in apparatus and operation accure to the invention.

Accordingly, it is an object of the invention to provide a novel method and means for recording information on a deformable recording member which does not require the employment of an information modulated electrostatic surface charge applied to the recording member.

It is another object of the invention to provide a novel method and means for recording information on a deformable recording member which obviates the requirement of any form of electrical field forces applied to the member.

It is another object of the invention to provide a novel method and means for recording information on a deformable recording member without the requirement of a vacuum.

It is a further object of the invention to provide a novel method and means for photocopying an image from a photographic film to a thermoplastic recording member.

It is a further object of the invention to provide a novel method and means for recording analog and digital information on a thermoplastic recording member which does not require an information modulated electrostatic surface charge applied to the member.

It is a further object of the invention to provide a thermoplastic recording process which requires a reduced quantity of thermal energy for developing the input information.

In accordance with a general aspect of the invention, information is impressed on a thermoplastic recording member by the application of a form of thermal energy modulated in accordance with said information, which energy differentially softens the thermoplastic. Since the information must be stored in the recording member in the form of surface deformations, the recording member must be preconditioned before applying the modulated thermal energy so as to translate the differential softening of the member into a corresponding differential surface deformation. The preconditioning is accomplished by uniformly pre-stressing spatially distributed portions of the thermoplastic member, which permits the surface of the member to deform in accordance with the subsequently applied modulated thermal energy. Either mechanical or electrical forces are employed in the pre-stressing operation.

Mechanical pre-stressing is accomplished by providing the surface of the recording member with a plurality of continuous and uniform deformations. The deformations introduce localized internal stresses and surface tensions of uniform magnitude in the recording member which are relieved in accordance with the degree of softening of the thermoplastic member by the modulated thermal energy to thereby provide a modulated deformation of the thermoplastic surface. Electrical pre-stressing is effected by applying a continuous, periodic electric field of uniform strength to a smooth surface recording member for applying a force normal to said surface. This pre-stressing introduces localized internal stresses due to the force normal, which stresses together with the thermal softening of the material provide the desired surface deformations. Thus, in the mechanical pre-stress embodiment the deformations are differentially erased in accordance with the information modulations, and in the electrical pre-stress embodiment, the previously smooth tape surface is deformed in accordance with the information modulations. The thermoplastic is then allowed to cool and the information is permanently stored in the resulting surface deformations.

In a more specific aspect of the invention, a photographic film is copied on a thermoplastic member by transmitting heat in the form of radiant energy from a high intensity source through the density modulations of the film onto the thermoplastic material which has been pre-stressed either mechanically or electrically, as described above. The surface of the thermoplastic is thus heated as a function of the density modulations of the image contained in the photographic film and the resulting surface deformations provide a copy of the original image. The image on the thermoplastic material may then be retrieved by means of a conventional optical phase demodulation system which responds to diffracted light.

In accordance with another aspect of the invention, the thermoplastic member, having the image stored therein in the form of surface deforamtions, may be employed as a printing plate for printing purposes.

In accordance with still another aspect of the invention, digital or analog information may be recorded on a pre-stressed thermoplastic tape by applying to said pre-stressed tape a source of thermal energy electrically or mechanically modulated in accordance with said information.

While the specification concludes with claims particularly pointing out and distinctly claiming the subject matter which is regarded as the invention, it is believed that the invention will be better understood from the following description taken in connection with the accompanying drawings in which:

Figure 1:
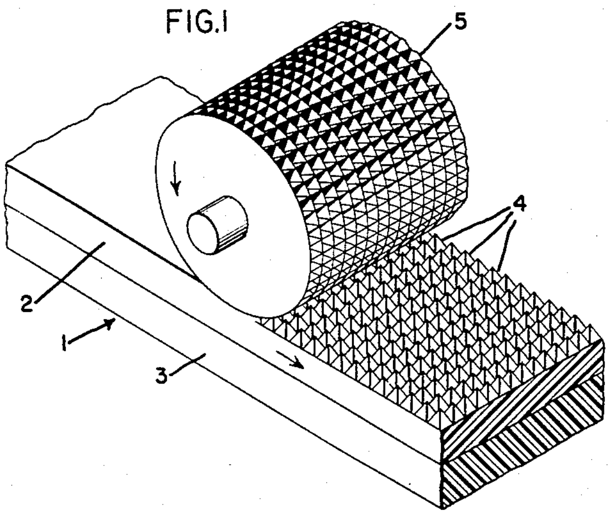
FIGURE 1 is a three dimensional view of one technique for mechanically embossing the surface of a thermoplastic tape.

Referring now to FIGURES 1 to 4 which relate to the mechanical pre-stressing embodiments of the invention, in FIGURE 1 a thermoplastic recording member 1 comprising a layer of thermoplastic material 2, supported by a base layer 3 is pre-deformed by being provided with a pattern of uniform minute embossments 4 on the surface of the thermoplastic material 2. The embossments 4 are supplied by means of a metal drum 5 having a uniformly dimpled surface which is rolled across the thermoplastic surface under a pressure sufficient to deform the thermoplastic when cold, or in its normally solid state. FIGURE 1 is a highly magnified and partial view of the member 1 and drum 5 so as to clearly indicate the configuration of the pre-deformed surface. It may be appreciated that the embossments 4 extend over the entire surface area. Although the embossments 4 are illustrated as minute pyramids, they can readily assume a diversity of dotted shapes in a regular or irregular pattern, or be in the form of strips. It is noted that the embossments should be of approximately the same shape and size so that they will be differently erased in proportion to the subsequently applied thermal energy, and the average spacing of the embossments should be sufficient to provide the required recorded information resolution in accordance with well understood principles. The embossing mechanism may be of other conventional types, such as a screen structure. If desirable, the embossing may be performed on a molten thermoplastic, as well as a solid material, with pressure being applied to the thermoplastic surface until cool. In addition, the embossments may be obtained by applying electrostatic forces to the thermoplastic with sufficient heat to allow the forces to deform the surface. This form of embossing, which may be desirable for higher information resolution, normally requires an additional conducting layer, such as shown in FIGURE 5.

It will be seen that the pattern of uniform surface pre-deformations serves two purposes: it translates the modulations of the subsequently applied thermal energy into modulations of the thermoplastic surface due to the resulant differential erasure of the pre-deformations; and it provides a grating structure which makes the developed thermoplastic recording member compatible with known optical phase demodulation projection systems.

The physical characteristic of the member 1 is dependent upon the particular application being considered. For photocopying purposes, or digital and analog recording, the base layer 3 may be a conventional 35 mm. plastic film stock on the order of 1 to 4 mils in thickness, and the thermoplastic layer 2 may be a PS–2 hyperclean polystyrene of a thickness on the order of 1 mil. A suitable height for the embossments 4 is approximately 5 to 10 microns. For printing, the base layer may be a metal or other appropriate material providing a rigid support, and the thermoplastic material is preferably one having a hard characteristic at room temperature on the order of 1 to 100 mils in thickness. The height of the embossments 4 may be on the order of .5 to 50 mils. The spatial frequency may vary from 5 to 300 or more embossments per millimeter, the greater the number the more the information that can be stored.

Figure 2:
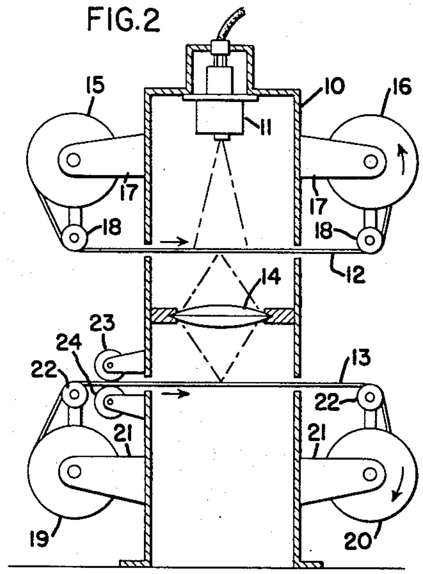
FIGURE 2 is a three dimensional view of one form of apparatus employed for photocopying an image from a photographic film onto a mechanically pre-deformed thermoplastic tape.

The recording of information, in accordance with this aspect of the invention, will be described with respect to a photocopying process in which the image of a photographic film is copied on a thermoplastic tape. In FIGURE 2 there is illustrated a photocopying apparatus including a supporting structure 10 on which is mounted a source of radiant energy 11, typically a high intensity radiant energy source of short duration such as an Xenon FT524 GE flash lamp. The structure 10 further supports the transport mechanism for the photographic film 12 and the thermoplastic tape 13, and an imaging lens 14. The photographic film transport mechanism includes a feed reel 15, a take-up reel 16, each supported by brackets 17, and a pair of guide wheels 18. Similarly, the tape transport mechanism includes feed reel 19, take-up reel 20, brackets 21 and guide wheels 22. There is also illustrated drum 23, similar to drum 5 of FIGURE 1, which deforms the tape 13 by pressing it against a smooth surfaced drum 24, drums 23 and 24 being supported by the structure 10.

The radiant energy transmitted from the source 11 passes through the film 12 and the intensity thereof is modulated by the density variations of the image contained in the film. The modulated energy is then imaged by the lens 14 onto the uniformly pre-deformed thermoplastic tape 13 and differentially erases the embossments thereon in accordance with the information contained in the image. The effect of the modulated energy on the pre-deformed surface of the thermoplastic tape may be more thoroughly appreciated by considering FIGURE 3.

Figure 3:
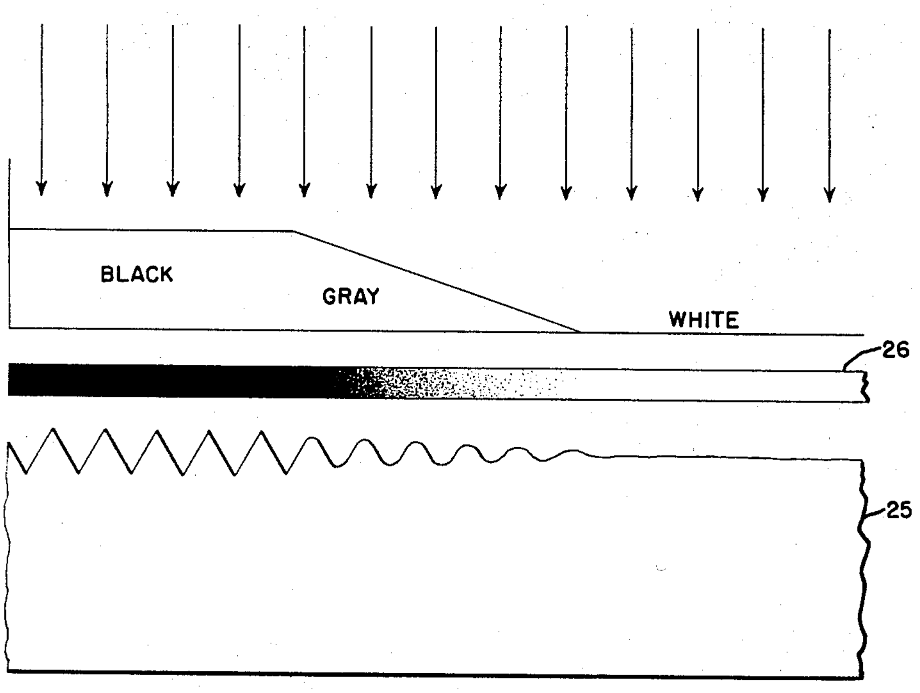
FIGURE 3 is a schematic illustration showing the application of modulated radiant energy to a pre-deformed thermoplastic tape in accordance with the photocopying process of FIGURE 2.

In FIGURE 3 there is shown schematically a side view of a pre-deformed thermoplastic material 25 having radiant energy modulated by the image of photographic film 26 applied to the surface thereof. For purposes of illustration the image is shown as being composed of three distinct areas, black, grey and white. The radiant energy intensity is symbolically illustrated by arrows. Essentially no energy is transmitted through the black portion of the image, high intensity energy is transmitted through the white portion and some intermediate intensity energy is transmitted through the grey portion.

It may be observed that in the region of the thermoplastic surface where little or no energy is applied, the embossed pattern is essentially undisturbed. In the region where the energy intensity is of an intermediate nature, the thermoplastic material is softened so that the acting internal stresses and surface tensions provided by the pre-deformations cause the embossed pattern to be partially erased in accordance with the amount of energy applied. Where high intensity energy is applied, the thermoplastic material is softened sufficiently so that the embossed pattern is essentially completely erased. Information is thus recorded in the resultant surface deformations. By recording information in this manner the density modulations of the photographic film are copied by being transformed onto the thermoplastic material in the form of optical phase modulations.

It has been unexpectedly demonstrated that appreciably less thermal energy is required to impress information on a thermoplastic material that has been mechanically pre-deformed in a solid state than one which has been pre-deformed in a molten state; or than is required to impress information on smooth thermoplastic material which has applied thereto a modulated electrostatic surface charge. Thus, cold pre-deformed thermoplastic has been found to require on the order of ⅕ to $\frac{1}{10}$ the thermal energy required in the other techniques. This is believed to be the result of the type of internal stresses and surface tensions that are present in the cold predeformed thermoplastic.

The stored information may be retrieved by projection in an optical phase demodulation system which responds to diffracted light caused by the surface deformations of the tape. One such comparable system is described in the previously referenced Newberry application. In this system the amount of light projected through the thermoplastic tape which reaches the screen is proportional to the degree of diffraction and scattering provided by the surface deformations of the tape, and the degree of diffraction and scattering is a function of the obliqueness of the tape surface. Thus, considering the surface configuration shown in FIGURE 3, the areas corresponding to the black portion of the photographic film provide maximum diffraction of projected light, the areas corresponding to the white portion provide a minimum diffraction and the areas corresponding to the grey portion provide a diffraction intermediate the other two. In this manner, the image of the photographic film 26, be it a negative, can be copied on the thermoplastic tape in the form of a positive with areas of the tape corresponding to the black portion of the negative providing maximum illumination and the areas corresponding to the white portion of the negative providing minimum illumination. An image inverison can be readily accomplished in an appropriate optical projection system by well known techniques so that either a positive or negative image can be retrieved from the thermoplastic tape from either a positive or negative photographic film.

Referring again to the photocopying apparatus of FIGURE 2, it is noted that the photographic film 12, rather than being employed as an object, as shown, can be placed directly in contact with the thermoplastic tape 13 and a copy obtained by radiating the thermal energy directly on to the negative. It is of course required in such embodiment, as in the one shown in FIGURE 2, that the intensity and duration of the energy utimately applied to heat the thermoplastic tape be of such an order as to provide surface deformations that are proportional to the information modulations.

Since the developed thermoplastic tape has the image impressed in the form of surface deformations, it may readily have application to printing processes. Thus, by inking the surface of the tape so that only the high level regions are darkened the tape may be used as a half-tone printing plate in a manner comparable to a lithographic printing process in which etched metallic plates are normally employed. It may be noted that when, e.g., a photographic negative is copied for a printing process application, the image is printed in its negative form since the high level regions of the tape corresponds to the black portion of the negative and the low level regions to the white portions. Accordingly, if positives are to be printed, photographic positives may be used in the copying process.

Although a triangular configuration for the embossments is desirable for maximum gamma in applications where the stored information is retrieved by projection systems, for printing processes, a squared off or other geometrical configuration providing a greater inking surface may be more suitable.

Figure 4:
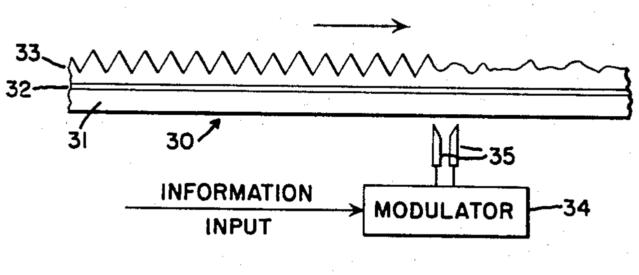
FIGURE 4 is a schematic illustration of an apparatus for applying information of a digital or analog nature to a mechanically pre-deformed thermoplastic tape by a modulated inductive heat source.
Figure 5:
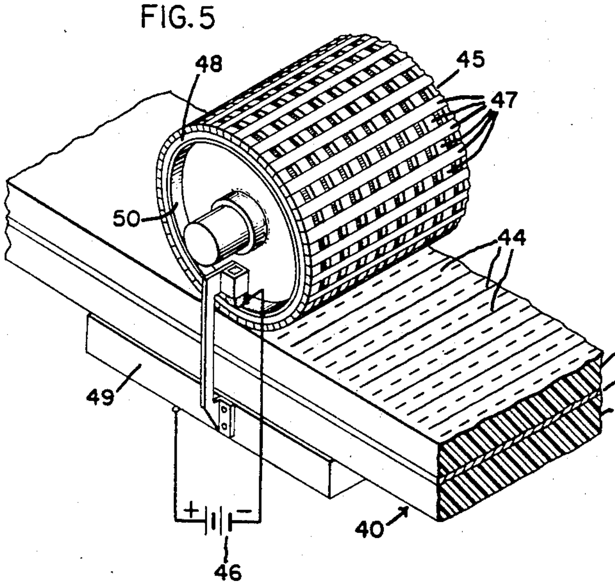
FIGURE 5 is a three dimensional view of one technique for applying a uniform electrostatic charge in the form of a grating to the surface of a thermoplastic tape.

Referring now to FIGURE 4 there is illustrated a further embodiment of the mechanical pre-deformation process wherein modulations of analog and digital information may be recorded in single or multiple channels. In this embodiment, the thermoplastic tape 30 is composed of three layers, a base layer 31, a thin conducting layer 32 and a thermoplastic layer 33. Input information is applied to amplitude or frequency modulate an RF energy source and a modulator 34 which is coupled to a pair of electrodes 35. The electrodes 35 are capacitively coupled to the conducting layer 32 for inducing RF currents in said conducting layer which locally heat the thermoplastic material 33. Thus, the RF currents, and hence the heat applied thereby, are modulated by the input signal to differentially erase the pre-deformed surface in accordance with the input information.

This embodiment of the invention may take other forms. For example, the conducting layer of the thermoplastic tape may be deleted and the modulated energy applied to the thermoplastic material from a source such as source 11. In such embodiment, the energy may be modulated by being transmitted through an adjustable aperture, the opening of which is controlled in accordance with input information. Or in another configuration, the aperture is fixed and the electrical energy for energizing the heat source is modulated in accordance with the input information. In still another embodiment, a sharply focused modulated thermal energy source may be scanned over the pre-deformed thermoplastic material, much the same as an electron beam, thereby storing information on a two dimensional surface.

Figure 6:
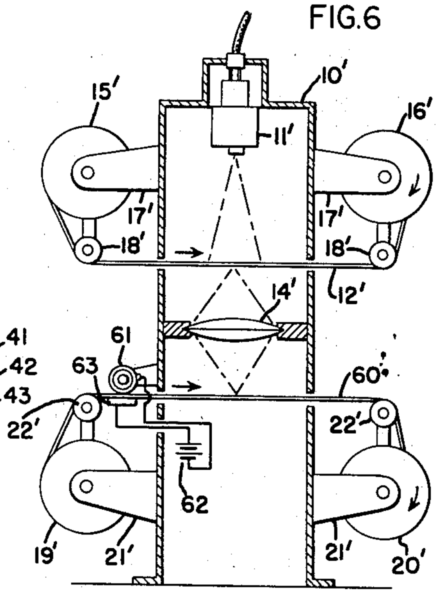
FIGURE 6 is a three dimensional view of a photocopying apparatus wherein an image is impressed on a thermoplastic tape which has been pre-charged in the manner shown in FIGURE 5.
Figure 7:
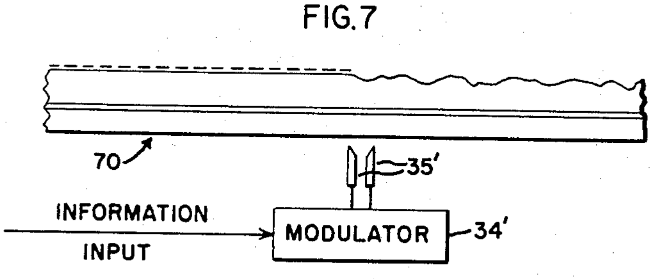
FIGURE 7 is a schematic illustration of a digital or analog recording apparatus wherein the information is impressed onto a pre-charged thermoplastic tape.

FIGURES 5 to 7 relate to the electrical pre-stressing embodiments of the invention. Referring now to FIGURE 5, which as in FIGURE 1 is a highly magnified and partial view, a thermoplastic recording medium 40 composed of three layers, a thermoplastic layer 41, an intermediate conducting layer 42 and a supporting base layer 43, is provided with a continuous, periodic electrostatic surface charge 44 of uniform intensity. The charge must be of uniform intensity so that the surface deformations resulting from the subsequently applied modulated thermal energy are proportional to the modulations.

The uniform, periodic surface charge may be applied by means of a drum 45 and a source of bias voltage, typically a battery 46. The drum 45 is composed of parallel strips 47 of electrically conducting material superimposed on the exterior surface of a metallic cylinder 48 to form a grating structure. The drum is rolled across the surface of the thermoplastic material so as to bring the conducting strips in contact, or near contact, with the thermoplastic. The conductor strips 47 may have a spatial frequency of 5–300 or more strips per millimeter, similar to the spatial frequency of the mechanical embossments of FIGURE 1. The negative terminal of battery 46, which may have a voltage in the range of 300 to 1000 volts, is connected through a metal slip ring 50 to the metal cylinder 48 by a slidable contact, and the positive terminal is connected to a metallic backing plate 49 which is in contact with the base layer 43. Thus, electrons will flow from the negative terminal of the battery 46 through the conducting strips 47 to the surface of the thermoplastic layer 41 so as to provide a uniform and periodic surface charge.

Although charge is shown to be applied in the form of a grating structure of crossbars, it may be applied as a parallel line charge, and may be laid down by other means than shown in FIGURE 5. For example, the conducting strips may be superimposed on a flat plate, or for fine resolution, the uniform charge may be applied by an electron beam. In addition, the charge may be applied in an irregular manner as long as the average spacing of the charge is sufficient to produce the required resolution.

Referring now to FIGURE 6, there is shown a photocopying apparatus similar to the one shown in FIGURE 2 but wherein the thermoplastic is now pre-stressed by application of a uniform, periodic electrostatic charge, prior to the impressing of the image. Thus, the elements shown in FIGURE 6 which are similar to those shown in FIGURE 2 are similarly identified, but with an added prime notation. The thermoplastic tape 60 is electrically pre-stressed, by an assembly similar to that shown in FIGURE 5, including drum 61 and a battery 62 having its terminals connected between the metallic cylinder of the drum 61 and a backing plate 63. The drum 61, battery 62 and backing plate 63 are supported by the mounting structure 10'. The uniformly charged thermoplastic tape 60 is exposed to the modulated thermal energy, whereby the image from the photographic film 12' is impressed on the thermoplastic tape 60. Deformation will occur at the localized portions of the tape surface where charge has been deposited due to the forces of attraction between the surface charge and the image charge provided by the conducting layer, the deformation being proportional to the amount of thermal energy applied. It is noted that the conducting layer may be deleted and an external backing plate employed during exposure to provide the attractive forces.

In FIGURE 7 there is illustrated an analog and digital recording apparatus, similar to the one shown in FIGURE 4, but wherein a uniformly and periodically charged smooth surface thermoplastic tape 70 is modulated by an inductive RF heater. Components similar to these of FIGURE 4 are identified similarly, but with an added prime notation. The operation of the apparatus in FIGURE 7 is essentially the same as indicated with respect to FIGURE 4 except that the impressed information is now stored in deformations resulting from the modulated thermal softening in combination with the compressive forces applied by the uniform surface charge.

Although the invention has been described with relation to a number of specific embodiments for purposes of complete disclosure, it is apparent that many modifications and variations may occur to those skilled in the art which are embodied in the basic teachings contained herein. Accordingly, it is intended that the appended claims include all such modifications that fall within the true scope and spirit of the invention.

What I claim as new and desire to secure by Letters Patent of the United States is:

1. A method of recording information on a thermally softenable member comprising the steps of: uniformly pre-stressing spatially distributed portions of said member so that the surface of said member will deform when softened and applying thermal energy modulated by said information to the pre-stressed member for selectively softening said member whereby said surface is deformed in accordance with said information.

2. A method of recording information on a thermally softenable member comprising the steps of: pre-stressing said member in a manner creating a spatial distribution of localized stresses of essentially uniform magnitude so that the surface of said member will deform when softened and applying thermal energy modulated by said information to the pre-stressed member for selectively softening said member whereby the surface of said member is deformed in accordance with said information.

3. A method of recording information on a thermally softenable member comprising the steps of: uniformly pre-stressing spatially distributed portions of said member so that the surface of said member will deform when softened, the average spatial distribution of said portions being compatible to the desired recorded information resolution, and applying thermal energy modulated by said information to the pre-stressed member for selectively softening said member whereby said surface is deformed in accordance with said information.

4. A method of recording information on a thermally softenable material comprising the steps of: uniformly pre-deforming the surface of said material at a predetermined spatial frequency so that the surface of said material will deform when softened and applying thermal energy modulated by said information to the pre-deformed surface for selectively softening said material whereby said surface is deformed in accordance with said information.

5. A method of recording information on a thermally softenable material comprising the steps of: uniformly pre-charging the surface of said material at a predetermined spatial frequency so that elemental portions of said material will deform when softened and applying thermal energy modulated by said information to the precharged surface for selectively softening said material whereby said surface is deformed in accordance with said information.

6. A method of recording information on a thermally softenable material comprising the steps of: applying a periodic electrostatic charge of uniform magnitude to the surface of said material so that elemental portions of said material will deform when softened and applying thermal energy modulated by said information to the charged surface for selectively softening said material whereby said surface is deformed in accordance with said information.

7. Apparatus for copying the image of a photographic film on a deformable recording member comprising means for uniformly prestressing spatially distributed portions of said member so that the surface of said member will deform when softened, a source of thermal energy, means for modulating the intensity of said energy in accordance with said image by radiating said energy through the photographic film, and means for applying the modulated energy to the surface of said recording member whereby in response to said pre-stressing and the application of said modulated thermal energy said surface is deformed in accordance with said image.

8. Apparatus for copying the image of a photographic film on a thermoplastic member composed of at least a layer of thermoplastic material and a supporting base layer comprising means for mechanically pre-deforming the surface of said thermoplastic material with a pattern of embossments of uniform configuration so that the surface of said thermoplastic material will deform when softened, a source of thermal energy, means for modulating the intensity of said energy in accordance with said image by radiating said energy through the photographic film, and means for applying the modulated energy to the surface of said thermoplastic material whereby the pre-deformed surface is differentially erased in accordance with said modulated energy, the image being thereby impressed on the thermoplastic member.

9. Apparatus for copying the image of a photographic film on a photographic member composed of at least a layer of thermoplastic material and a supporting base layer comprising means for applying a periodic electrostatic charge of uniform magnitude to the surface of said thermoplastic layer so that the surface of said thermoplastic material will deform when softened, a source of thermal energy, means for modulating the intensity of said energy in accordance with said image by radiating said energy through the photographic film and means for applying the modulated energy to the surface of said thermoplastic material whereby the charged surface is differentially deformed in accordance with said modulated energy, the image being thereby impressed on the thermoplastic member.

10. Apparatus for recording information on a deformable recording member comprising means for uniformly pre-stressing spatially distributed elemental portions of said member so that the surface of said member will deform when softened, a source of thermal energy, means for modulating the intensity of said energy in accordance with said information, and means for applying the modulated energy to said member whereby said surface is deformed in accordance with said information.

11. Apparatus for recording information on a thermoplastic tape, said tape being composed of at least a layer of thermoplastic material and a layer of electrically conducting material comprising means for mechanically pre-deforming the surface of said thermoplastic material with a pattern of embossments of uniform configuration so that the surface of said thermoplastic material will deform when softened, a source of radio frequency energy, means for modulating said radio frequency energy by said information and means for capacitively coupling said modulated energy to said conducting layer for locally heating said thermoplastic material whereby the predeformed surface is differentially erased in accordance with said modulated energy.

12. An apparatus for recording information on a thermoplastic tape, said tape being composed of at least a layer of thermoplastic material and a layer of electrically conducting material comprising means for applying a periodic electrostatic charge of uniform magnitude to the surface of said thermoplastic material so that the suface of said thermoplastic material will deform when softened, a source of radio frequency energy, means for modulating said radio frequency energy by said information, and means for capacitively coupling said modulated energy to said conducting layer for locally heating said thermoplastic material whereby the charged surface is differentially deformed in accordance with said information.

13. In combination in a system for recording information on a recording medium having a thermoplastic layer on one surface of the medium, first means operatively coupled to the medium for obtaining a movement of the medium in a first direction, second means operatively coupled to the thermoplastic layer on the one surface of the medium during the movement of the medium in the first direction for forming a grated surface extending upwardly from the one surface of the medium to serve as a recording track on the medium, and third means operatively coupled to the recording medium for recording information on the grated surface formed on the thermoplastic layer.

14. In combination in a system for recording information on a recording medium having a thermoplastic layer on one surface of the medium, first means operatively coupled to the medium for obtaining a movement of the medium in a first direction, second means operatively coupled to the thermoplastic layer on the one surface of the medium during the movement of the medium in the first direction for preforming a ridge extending upwardly from the one surface of the medium to serve as a recording track on the medium, and third means operatively coupled to the recording medium for recording information on the preformed ridge of the thermoplastic layer by modulating the surface characteristics of said preformed ridge in accordance with said information.

15. In combination in a system to record information in a medium having a thermoplastic layer of material on one surface of the medium and having an upwardly extending ridge on the thermoplastic layer to serve as a recording surface, first means operatively coupled to the medium for providing a movement of the medium in a particular direction, second means responsive to the information for providing a beam of energy having characteristics in accordance with the characteristics of the information to provide a heating of the thermoplastic layer on the medium, and third means operatively coupled to the second means for directing the beam of energy toward the upwardly extending ridge on the medium during the movement of the medium in the particular direction to vary the surface characteristics along the upwardly extending ridge on the medium in accordance with the characteristics of the beam of energy.

16. In combination in a system to record information on a movable medium having a thermoplastic layer of material on one surface of the medium and having an upwardly extending ridge on the thermoplastic layer to serve as a recording surface, first means operatively coupled to the medium for providing a movement of the medium in a particular direction, second means responsive to the information for providing a beam of infrared energy having characteristics in accordance with the characteristics of the information to provide a heating of the thermoplastic layer on the medium, and third means operatively coupled to the second means for directing the beam of infrared energy toward the upwardly extending ridge on the medium during the movement of the medium in the particular direction for heating progressive positions along the ridge in accordance with the characteristics of the infrared beam of energy to flatten portions of the ridge in representation of the information.

17. In combination in a system to record information on a movable recording tape having a thermoplastic layer of material on one surface of the tape and having a series of adjacent upwardly extending ridges on the thermoplastic layer laterally across the tape to form a recording track on the tape, first means operatively coupled to the tape for providing a longitudinal movement of the tape in a particular direction, second means responsive to the information for providing a beam of infrared energy having characteristics in accordance with the characteristics of the information to provide a heating of the thermoplastic layer on the tape, and third means operatively coupled to the second means for directing the beam of infrared energy along each upwardly extending ridge on the tape during successive periods of time during the movement of the tape in the particular direction for heating progressive positions along each ridge in accordance with the characteristics of the infrared beam of energy to flatten portions of each ridge in representation of the information.

References Cited

UNITED STATES PATENTS

| | | | |
|---|---|---|---|
| 1,891,780 | 12/1932 | Rutherford | 346—77 X |
| 2,616,961 | 11/1952 | Groak | 178—5.2 |
| 2,698,928 | 1/1955 | Pulvari | 340—173 |
| 2,956,487 | 10/1960 | Giaimo | 95—1.7 |
| 2,993,805 | 7/1961 | Kay | 117—62 |

RICHARD B. WILKINSON, *Primary Examiner.*

JOSEPH W. HARTARY, *Assistant Examiner.*